(12) United States Patent
Kato et al.

(10) Patent No.: US 6,244,496 B1
(45) Date of Patent: Jun. 12, 2001

(54) CONNECTED STRUCTURE AND METHOD FOR MANUFACTURING THE SAME

(75) Inventors: Rentaro Kato; Koji Uchino; Yuichi Ogawa, all of Kasugai; Masatoshi Enomoto, Tochigi; Seiji Tasaki, Tochigi; Naoki Nishikawa, Tochigi; Naoyuki Kawata, Tochigi; Takenori Hashimoto, Tochigi, all of (JP)

(73) Assignees: Tokai Rubber Industries, Ltd., Aichi-Ken; Showa Aluminum Corporation, Osaka, both of (JP)

( * ) Notice: Subject to any disclaimer, the term of this patent is extended or adjusted under 35 U.S.C. 154(b) by 0 days.

(21) Appl. No.: 09/218,591

(22) Filed: Dec. 22, 1998

(30) Foreign Application Priority Data

Dec. 25, 1997 (JP) ................................................. 9-356579

(51) Int. Cl.⁷ ............................. B23K 20/12; B23K 31/02
(52) U.S. Cl. ..................................... 228/112.1; 228/114.5
(58) Field of Search ............................. 228/112.1, 114.5

(56) References Cited

U.S. PATENT DOCUMENTS

| | | | | |
|---|---|---|---|---|
| 4,144,110 | * | 3/1979 | Luc ........................................ | 156/73.5 |
| 4,262,187 | * | 4/1981 | Savor ................................ | 219/125.11 |
| 4,811,887 | * | 3/1989 | King et al. ................................ | 228/2 |
| 5,697,511 | * | 12/1997 | Bampton ................................ | 220/4.12 |
| 5,713,507 | * | 2/1998 | Holt et al. ................................ | 228/112.1 |
| 5,813,592 | * | 9/1996 | Midling et al. ................................ | 228/112.1 |
| 5,865,362 | * | 2/1999 | Behrmann et al. ................ | 228/114.5 |
| 5,875,953 | * | 2/1999 | Shioya ................................ | 228/112.1 |
| 6,050,474 | * | 4/2000 | Aota et al. ................................ | 228/112.1 |
| 6,105,849 | * | 11/1998 | Mochizuki et al. ................ | 228/112.1 |

FOREIGN PATENT DOCUMENTS

| | | | | |
|---|---|---|---|---|
| 2306366 | * | 7/1997 | (GB) ................................ | 228/112.1 |
| 63-225714 | * | 9/1988 | (JP) ................................ | 228/112.1 |
| 10-288209 | * | 10/1998 | (JP) ................................ | 228/112.1 |

\* cited by examiner

*Primary Examiner*—Geoffrey S. Evans
*Assistant Examiner*—Lynne Edmondson (57) ABSTRACT

A connected structure includes a supporting member and a bushing mounting member connected thereto. The supporting member is made of a pipe having a round cross-sectional shape. The bushing mounting member includes a bushing mounting portion for mounting a bushing having a rubber elastic member and a connecting portion protruded from the bushing mounting portion. The connecting portion is press-fitted into an opening at one end of the supporting member, and the connecting portion and the supporting member are joined together along a circumference of the supporting member by a friction agitation joining method. Accordingly, the connecting member which is light in weight and high in strength with an improved efficiency for utilizing the surrounding space and a predetermined characteristics of a bushing can be obtained.

6 Claims, 7 Drawing Sheets

CONNECTED STRUCTURE AND METHOD FOR MANUFACTURING THE SAME

BACKGROUND OF THE INVENTION

1. Field of the Invention

This invention relates to a connected structure, more particularly, to a connected structure including a supporting member and a bushing mounting member connected thereto for use as, for example, an automobile suspension arm or an engine mount.

2. Description of the Related Art

Figure 8A:
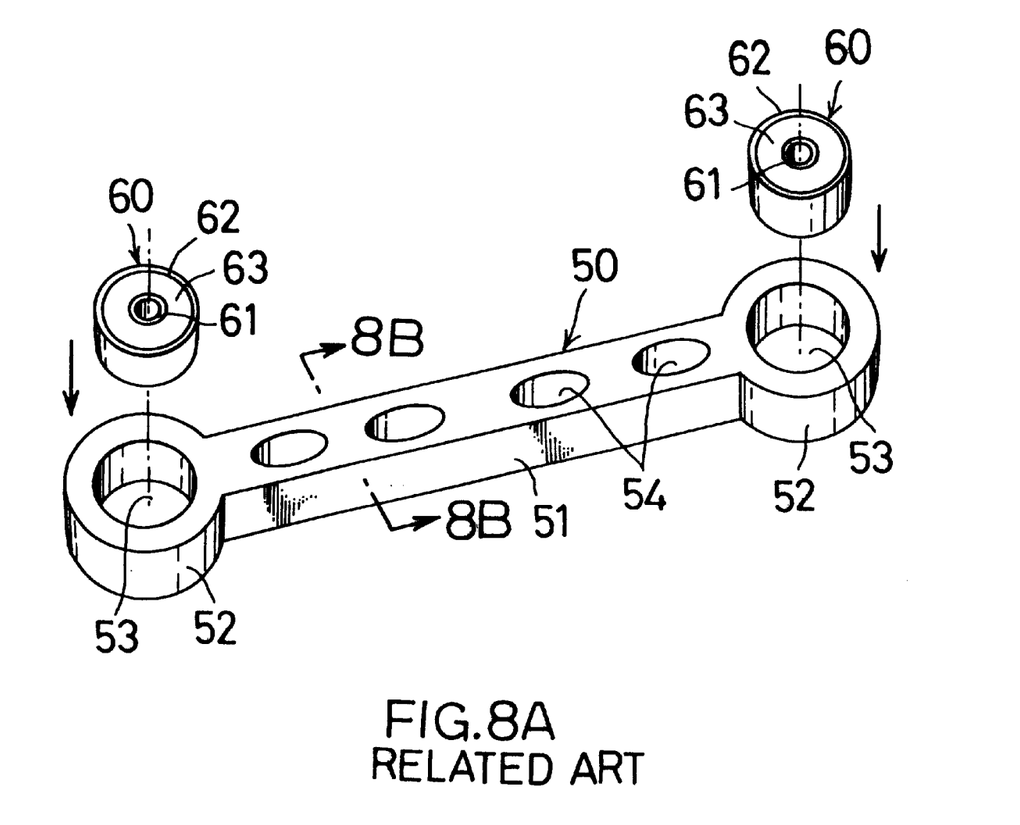
FIG. 8A is a perspective view showing a suspension arm of a related art, wherein the bushings are detached from the suspension arm.

FIG. 8A shows a conventional automobile suspension arm 50 used as an upper arm, a lower arm, a trailing arm or a torsion arm. The suspension arm 50 includes a rod-shape supporting portion 51 and a bushing mounting portion 52 formed at opposite ends of the supporting portion 51. The bushing mounting portion 52 may be formed at one end of the supporting portion 51. The bushing mounting portion 52 has a circular opening 53 for mounting a columnar vibroisolating bushing 60. The bushing 60 includes, for example, a central supporting member 61, an outer rigid sleeve 62 having an outer diameter slightly larger than the inner diameter of the opening 53, and a rubber elastic member 63 disposed between the center supporting member 61 and the outer rigid sleeve 62. The bushing 60 is press-fitted in the opening 53. As shown in FIG. 8A, the supporting portion 51 is provided with a plurality of penetrated holes 54.

The above suspension arm 50 has been manufactured by cutting an extruded article having a cross-section corresponding to the cross-section of the suspension arm 50 to have a predetermined thickness in the direction of the extrusion.

Figure 8B:
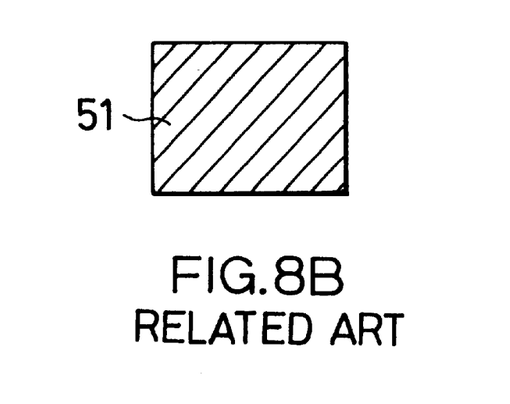
FIG. 8B is a cross-sectional view taken along the line 8B—8B of FIG. 8A.

Therefore, the supporting portion 51 is formed to have a rectangular shape in cross-section as shown in FIG. 8B. Such a rectangular cross-sectional shape of the supporting portion 51 inherently deteriorates the efficiency for utilizing the surrounding space. Further, the supporting portion 51 makes the whole suspension arm 50 heavy because the supporting portion 51 is formed to be non-hollow article.

It may be possible to manufacture the suspension arm 50 by separately preparing the supporting portion 51 and the bushing mounting portion 52, and then integrally joining them by a melt welding such as a MIG welding (metal electrode inert gas welding) and a TIG welding (tungsten-inert-gas arc welding), However, since the heat quantity of the melt welding is large, the rubber elastic member 63 of the bushing 60, which is press-fitted in the bushing mounting body 52, is influenced by the heat generated during the welding to cause the change of its characteristic. Further, such a large heat quantity may cause a poor joint between the supporting body 51 and the bushing mounting body 52, and/or a thermal fatigue of the supporting body 51 and the bushing mounting body 52.

SUMMARY OF THE INVENTION

An object of the present invention is to provide a connected structure for use as a suspension arm or the similar structure, which is light in weight and high in strength and has an improved efficiency for utilizing the surrounding space and a predetermined characteristics of a bushing, and also is to provide a method for manufacturing the connected structure.

Another object of the present invention is to provide a method for manufacturing a connected structure in which the manufacturing efficiency can be improved.

In order to attain the above object, according to the present invention, a connected structure includes a hollow supporting member having an opening at one end thereof, and a bushing mounting member having a bushing mounting portion for mounting a bushing having a rubber elastic member and a connecting portion protruded from the bushing mounting portion. The connecting portion is inserted in the opening and joined to the hollow supporting member along a circumferential direction thereof by a friction agitation joining method, whereby the bushing mounting member is integrally connected to the hollow supporting member.

According to the present invention, the connected structure can be light in weight since the supporting member is made of a hollow article. Further, since the bushing mounting member is joined to the hollow supporting member by a friction agitation joining method in which heat quantity is smaller than that of the melt welding such as a MIG welding or a TIG welding, the joint strength between the supporting member and the bushing mounting member will not deteriorate, and the materials of the connected structure will not be thermally fatigued. As a result, a connected structure having high joint strength and well joint condition can be obtained.

Even if the supporting member is joined in a state that the busing is mounted in the bushing mounting portion, characteristics of the bushing can be well maintained since the rubber elastic member of the bushing is hardly affected by heat.

When the hollow supporting member has a circular cross-sectional shape, surrounding space of the supporting member can be efficiently utilized.

Further, according to the present invention, a method for manufacturing a connected structure having a supporting member and a bushing mounting member connected to the supporting member, includes the steps of preparing a hollow supporting member having an opening at one end thereof, preparing a bushing mounting member having a bushing mounting portion for mounting the bushing and a connecting portion protruded from the bushing mounting portion, inserting the connecting portion into the opening of the hollow supporting member, and joining the connecting portion and the hollow supporting member along a circumference of the hollow supporting member by a friction agitation joining method.

According to the method, a lightweight connecting member can be obtained since the supporting member is made of a hollow article. Further, since the supporting member and the connecting portion inserted into the opening of the supporting member are joined along a circumference of the supporting member by the friction agitation joining method, a connected structure with a high joint strength and fine joint quality can be obtained.

If the connecting portion is press-fitted into the opening of the supporting member and the friction agitation joining method is performed by inserting a rotating probe into the connecting portion from the hollow supporting member to soften and agitate a portion where the probe contacts by friction heat, and rotating one of the connecting portion and the hollow supporting member along axis thereof, whereby both of the connecting portion and the hollow supporting member rotate together and the rotating probe advances along a circumference of the hollow supporting member, the joining can easily be performed.

If the friction agitation joining method is performed by using a joining device having a pin-shaped probe coaxially integrally protruded from an end surface of a columnar rotor having a diameter larger than a diameter of the probe, inserting the rotating probe into the connecting portion from the hollow supporting member to soften and agitate a portion where the probe contacts by friction heat, advancing the rotating probe along a circumference of the hollow supporting member in such a state that the end surface of the columnar rotor presses a portion of the hollow supporting member located behind said columnar rotor and is lifted up from a portion of the hollow supporting member located ahead of the columnar rotor, not only the rotating probe generates friction heat, but also the friction between the pressed portion of the end surface and a surface and an inner matrix of the supporting member generates friction heat. Thus, a portion of the supporting member and the connecting portion where the probe contacts and the region therearound can be softened quickly, resulting in speedy and efficient joining work. Further, since the end surface of the rotor is lifted up from the surface of the upstream portion of the supporting member, the edge of the end surface of the rotor facing the upstream portion of the supporting member can be prevented from being caught by the surface of the supporting member so as not to tear off the surface while the rotating probe advances. As a result, a connecting member with fine joint quality can be obtained.

If the friction agitation joining method is performed by using a coining device having a pin-shaped probe coaxially integrally protruded from an end surface of a columnar rotor having a diameter larger than a diameter of the prove, inserting the rotating probe into the connecting portion from the hollow supporting member to soften and agitate a portion where the probe contacts by friction heat, rotating the connecting portion and the hollow supporting member against the rotating probe in such a state that the end surface of the columnar rotor presses a downstream portion of the supporting member and is lifted up from an upstream portion of the supporting member, the efficiency of joining work can be also improved by the same reasons as described above. Further, since the end surface of the rotor is lifted up from the surface of the upstream portion of the supporting member, an edge of the end surface of the rotor facing the upstream portion of the supporting member can be prevented from being caught by the surface of the supporting member so as not to tear off the surface while the connecting portion and the supporting member rotate. As a result, a connected structure with fine joint quality can be obtained.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings. This embodiment is directed to a suspension arm used as one of automobile parts.

Figure 1:
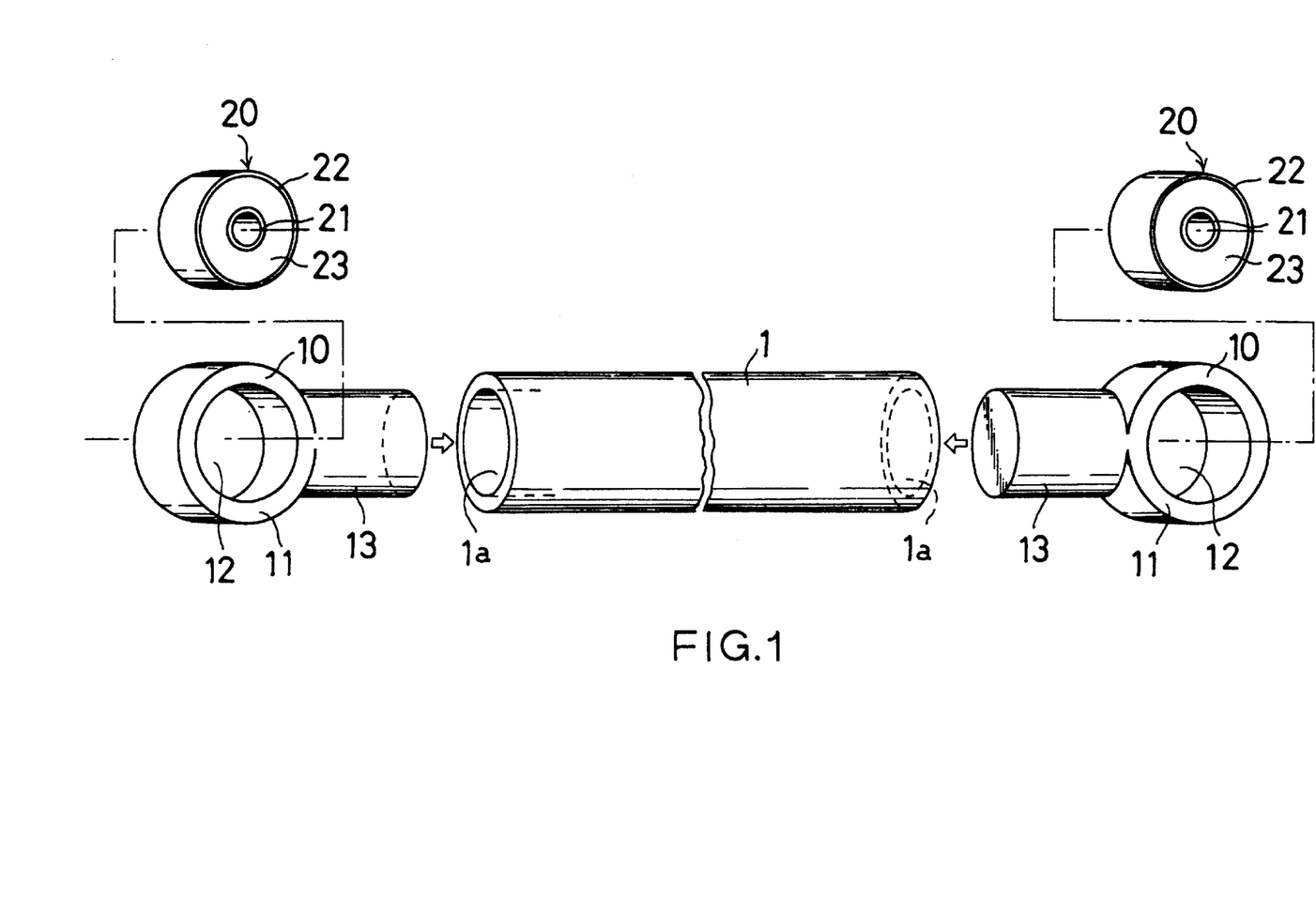
FIG. 1 is a perspective view showing a suspension arm as a connected structure according to an embodiment of the present invention, wherein a supporting member, a bushing mounting member and bushings are shown in a disassembled state.

As shown in FIG. 1, the suspension arm includes a rod-shaped supporting member 1, a pair of press-fitting-type bushing mounting members 10, 10, which are to be connected to opposite ends of the supporting member 1, and a pair of cylindrical vibroisolating bushings 20, 20. Each bushing 20 includes a central cylindrical supporting member 21, a cylindrical rigid sleeve 22 disposed around the supporting member 21, and a rubber elastic member 23 fitted between the supporting member 21 and the rigid sleeve 22. The rigid sleeve 22 has an outer diameter which is slightly larger than an inner diameter of an opening 12 of the bushing mounting member 10.

The supporting member 1 is a round hollow extruded pipe having a predetermined length, and can be made by cutting an extruded article having a round cross-sectional shape, which is made of an aluminum or its alloys (hereinafter referred to as "aluminum"), to have the predetermined length in the direction of the extrusion.

The bushing mounting member 10 is an aluminum diecast article including a cylindrical bushing mounting portion 11 with a round opening 12 into which the bushing 20 is firmly press-fitted. The bushing mounting member 10 further includes a columnar connecting portion 13 integrally connected to an outer circumference of the bushing mounting portion 11. The connecting portion 13 has a diameter slightly larger than an inner diameter of the supporting member 1 so that the connecting portion 13 can be firmly press-fitted into an opening 1a of the supporting member 1.

Now, the suspension arm as a connected structure of the embodiment according to the present invention will be explained with referring to the manufacturing method.

Figure 2:
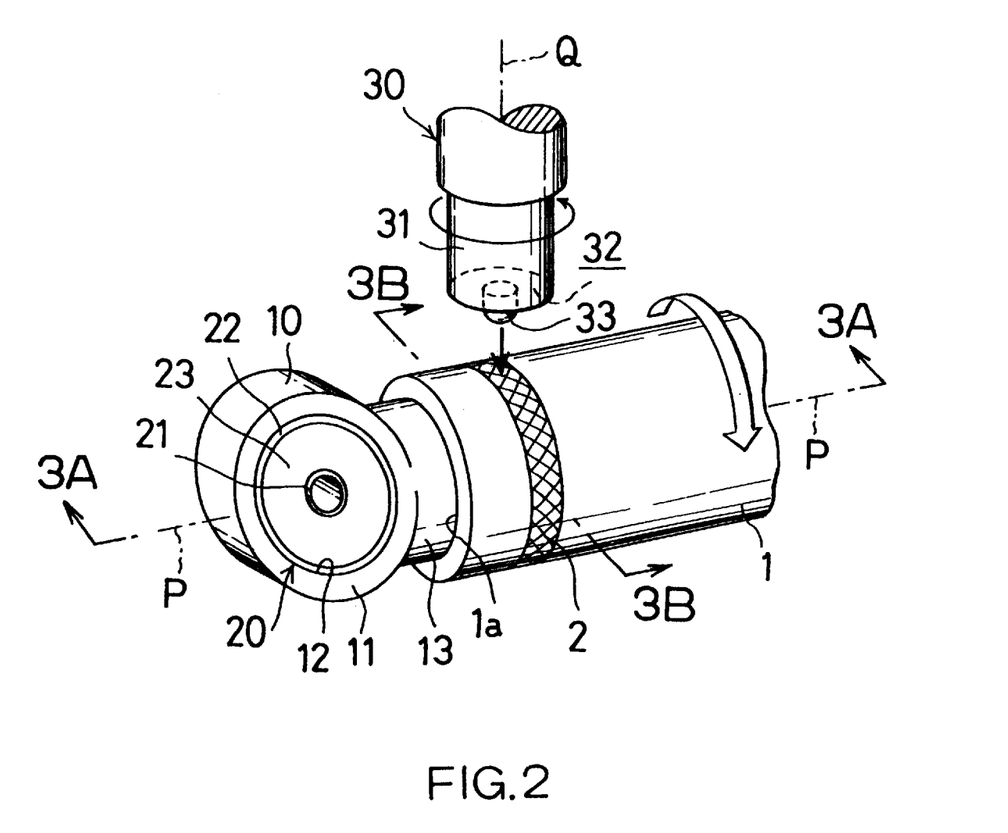
FIG. 2 is a perspective view showing one end of the supporting member into which a connecting portion of the bushing mounting member is inserted, and a joining device.

As shown in FIGS. 1 and 2, the bushing 20 is press-fitted into the opening 12 of the bushing mounting member 10, and the connecting portion 13 of the bushing mounting member 10 is press-fitted into the opening 1a of the supporting member 1. Then, the coupled portion of the connecting portion 13 of the bushing mounting member 10 and the supporting member 1 are joined along the whole circumference of the coupled portion by a friction agitation joining method. In FIG. 2, the reference numeral 2 denotes a circumferential region of the supporting member 1 where the friction agitation joining method is performed.

The friction agitation joining method is performed as follows. In the joining method, the following joining device 30 is used. The joining device 30 includes a column-shaped rotor 31 having a larger diameter and a pin-shaped probe 33 having a smaller diameter. The probe 33 is integrally provided on a flat end surface 12 of the rotor 31 so as to protrude along an axis Q thereof, and can rotate together with the rotor 31. First, the Joining device 30 is made to start rotating the rotor 31 with probe 33. Then, the joining device 30 is approached the supporting member 1 to insert the probe 33 into the circumferential region 2 of the supporting member 1. The material of the supporting member 1 where the rotating probe 33 contacts will be plastically softened by the friction heat generated by the friction between the rotating probe 33 and the supporting member 1. The rotating probe 33 is further pushed down so as to be further inserted into the supporting member 1 towards a central axis P thereof.

The insertion of the rotating probe 33 is performed such that the top portion of the probe 33 is inserted into the connecting portion 13 of the bushing mounting member 10 through the supporting member 1. During the insertion of the probe 33, the end surface 32 of the rotor 31 contacts the outer surface of the supporting member 1. Thus, the end surface 32, which is in contact with the supporting member 1, prevents the materials softened by the rotating probe 33 from being scattered. The end surface 32 of the rotor 31 also generates the friction heat by the friction between the end surface 32 of the rotor 31 and the outer surface of the supporting member 1, which facilitates the softening of a portion where the probe 33 contacts and a region there-around.

Figure 3A:
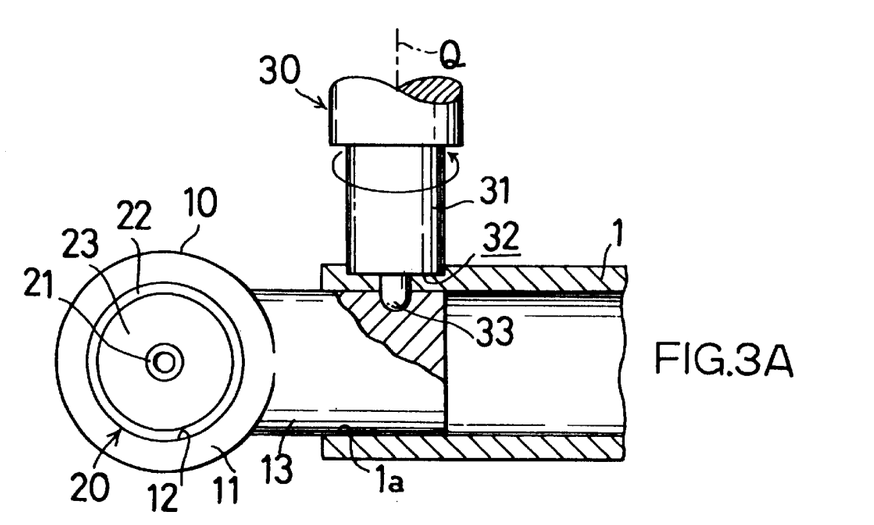
FIG. 3A is a partial cross-sectional view taken along the line 3A—3A of FIG. 2, wherein a probe of a joining device is inserted into the coupled portion of the supporting member and the joining portion of the bushing mounting member.
Figure 3B:
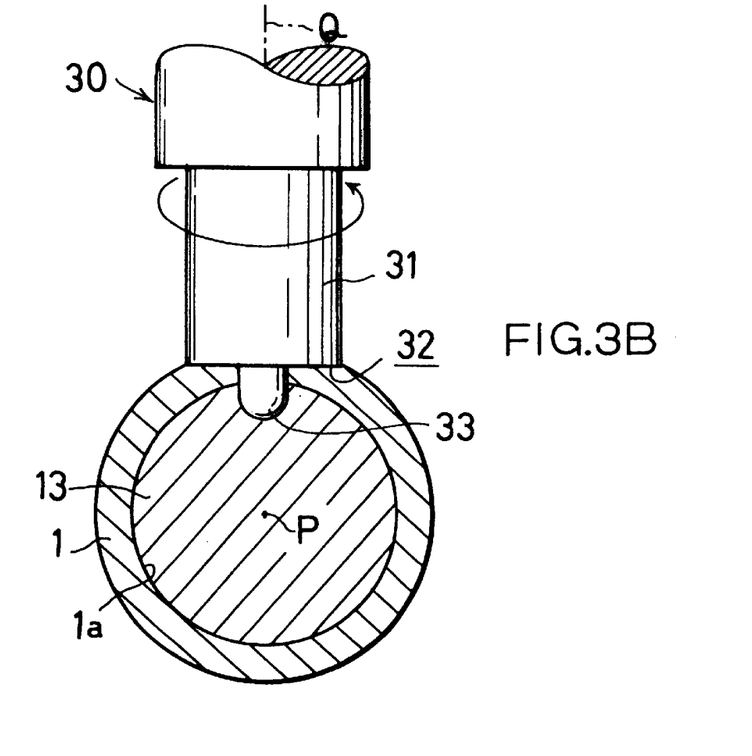
FIG. 3B is a cross-sectional view taken along the line 3B—3B of FIG. 2, wherein a probe of a joining device is inserted into the coupled portion of the supporting member and the joining portion of the bushing mounting member.

As shown in FIGS. 3A and 3B, the rotor 31 is further pushed down so that the end surface 32 of the rotor 31 advances into the supporting member 1 to have surface-to-surface contact with the supporting member 1. This generates larger amount of friction heat, whereby a portion where the probe 33 contacts and the region there-around can be softened quickly.

After the portion where the probe 33 contacts and the region there-around has been sufficiently softened, the supporting member 1 and the bushing mounting member 10 are rotated together about the axis P of the supporting member 1 so that the probe 33 passes through the predetermined joining region 2.

Since the connecting portion 13 of the bushing mounting member 10 is firmly press-fitted into the opening 1a of the supporting member 1 as described above, the bushing mounting member 30 and the supporting member 1 rotate together when one of them is driven to rotate. Thus, the rotating work can be simplified.

In this embodiment, the supporting member 1 is driven to rotate. When the supporting member 1 is driven to rotate, the bushing mounting member 10 rotates in accordance with the rotation of the supporting member 1.

Figure 4A:
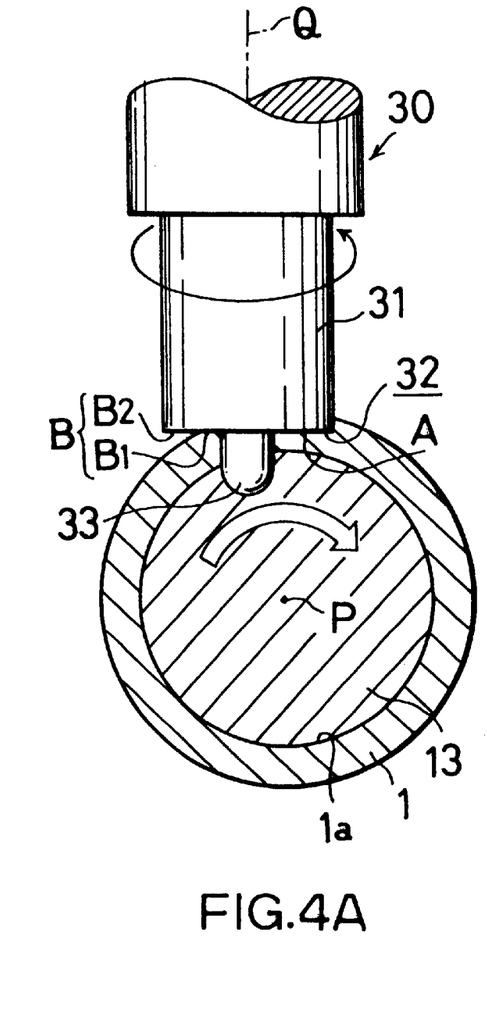
FIG. 4A is a cross-sectional view showing the joining device with a rotor inserted into the coupled portion of the connecting portion and the supporting member, wherein the joining device is horizontally shifted in the direction opposite to the rotational direction of the supporting member from the center of the coupled portion.
Figure 4B:
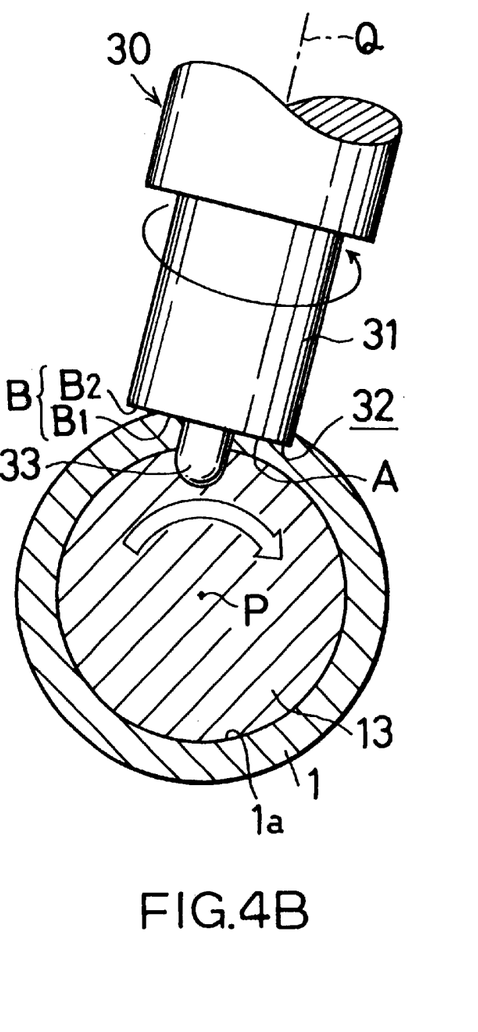
FIG. 4B is a cross-sectional view showing the joining device with a rotor inserted into the coupled portion, wherein the joining device is inclined in the rotational direction of the supporting member.

As shown in FIG. 4A, when the supporting member 1 and the bushing mounting member 10 are rotated, the joining device 30 is shifted horizontally in the direction opposite to the rotational direction of the supporting member 1 by about one fourth the diameter of the end surface 32 of the rotor 31 while pressing the rotor 31 toward the supporting member 1 with the probe 33 being inserted into the connecting portion 13. Thus, a portion A of the end surface 32 located at the downstream side of the rotating supporting member 1 and an inside portion B1 of the end surface 32 located at an upstream side of the rotating supporting member 1 is buried in the supporting member 1 while an outside portion B2 of the end surface 32 is lifted up from the surface of the supporting member 1. Alternatively, as shown in FIG. 4B, the joining device 30 may be inclined toward the rotational direction of the supporting member 1. In stead of shifting or inclining the joining device 30 after inserting the prove 33 as mentioned above, the shifted or inclined probe 33 as shown in FIGS. 4A and 4B may be inserted when inserting the prove 33.

Due to the friction heat generated by the friction between the rotating probe 33 and the supporting member 1 and the connecting portion 13 and the friction heat generated by the friction between the portions A and B1 of the end surface 32 and the inner matrix of the supporting member 1, the portion of the supporting member 1 and the connecting portion 13 where the probe 33 contacts and the region there-around can be quickly softened and agitated. In accordance with the rotation of the supporting member 1 and the bushing mounting member 10, the softened and agitated material is plastically fluidized to fill up a groove formed behind the probe 33 and the portions A and B1 of the end surface 32 of the rotor 31. Then, the material will be cooled and solidified by an immediate loss of the friction heat. This phenomenon will be repeated with the rotation of the supporting member 1 and the bushing mounting member 10, which results in a steady joining of the supporting member 1 and the bushing mounting member 10.

Figure 5A:
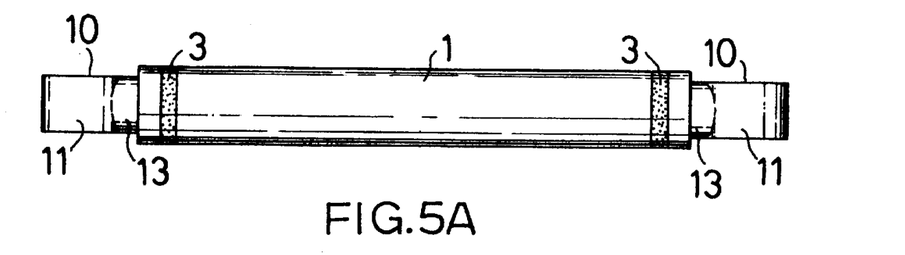
FIG. 5A is a plan view showing the connected structure having a supporting member and bushing mounting members connected to the supporting member, the bushing mounting portions facing in the same direction.
Figure 5B:
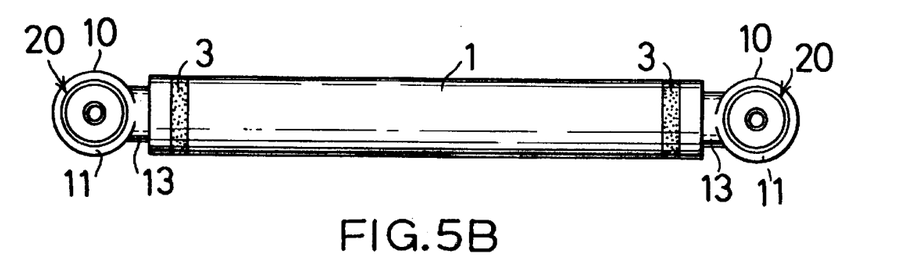
FIG. 5B is a front view showing the connected structure shown in FIG. 5A.

Thus, the suspension arm as shown in FIGS. 5A and 5B is manufactured. The suspension arm has the supporting member 1 and the bushing mounting members 10, 10 connected to opposite ends of the supporting member 1. In FIGS. 5A and 5B, the reference numeral 3 denotes a circumferentially joined portion by the joining device 30.

Since the supporting member 1 is a hollow pipe having a round cross-sectional shape, the suspension arm is light in weight and can enhance the efficiency for utilizing the surrounding space. In addition, since both the supporting member 1 and the bushing mounting member 10 are made of aluminum, the suspension arm can further be light in weight. since the friction agitation joining method, in which heat quantity is smaller than that of a melt welding such as a MIG welding, a TIG welding or a laser welding, is employed, the rubber elastic member 23 of the bushing 20 mounted in the bushing mounting member 10 is hardly affected by the heat generated during the joining process, thereby maintaining the characteristics of the bushing 20. In addition, a poor joint between the supporting member 1 and the bushing mounting member 10 and a thermal fatigue of the supporting member 1 and/or the bushing mounting member 10 will not cause, resulting in a suspension arm having a high joint strength and fine joint quality.

Figure 6A:
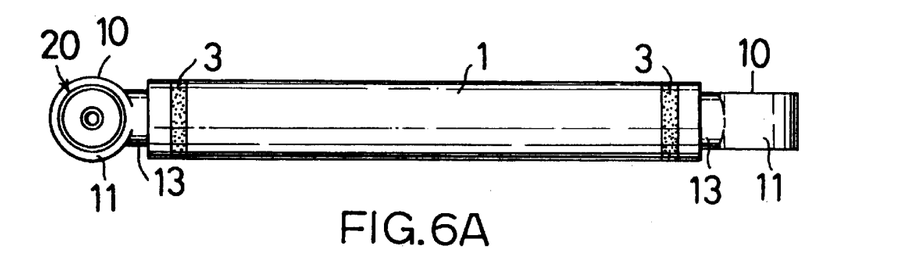
FIG. 6A is a plan view showing a connected structure having a supporting member and bushing mounting members connected to the supporting member, the bushing mounting members facing in the different direction.
Figure 6B:
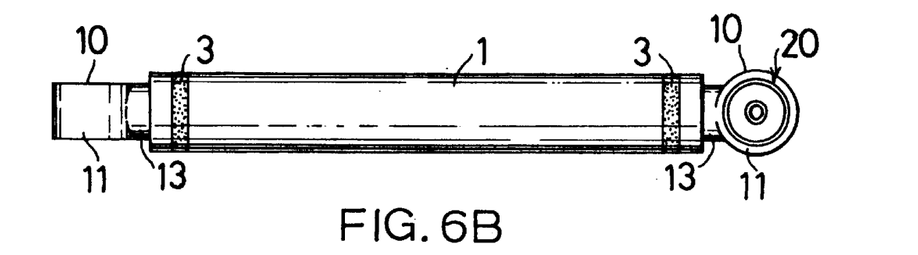
FIG. 6B is a front view of the connecting member shown in FIG. 6A.

In the above described embodiment, the relative angle of one bushing mounting portion 11 to the other bushing mounting portion 11 is set to be 0 degree. In other words, the axial directions of both the bushing mounting portions 11, 11 are oriented in the same direction. Alternatively, the relative angle of the bushing mounting portions 10, 10 may be set to be 90 degrees, as shown in FIGS. 6A and 6B. The detailed description of the embodiment shown in FIGS. 6A and 6B is omitted since the reference numerals used in the FIGS. 6A and 6B are the same as those used in the embodiment.

As is apparent. from FIGS. 5A, 5B, 6A and 6B, it is possible to change the orientation of the bushing mounting portions 11 against the supporting member 1. Since it is possible to change the relative angle of the axial directions of the bushing mounting portions 11, when two bushing mounting members 10, 10 are to be joined to the supporting member 1, any suspension arm having a desired relative angle of the axial direction of the bushing mounting portions 11 can be obtained without changing the specification of the suspension arm.

Figure 7A:
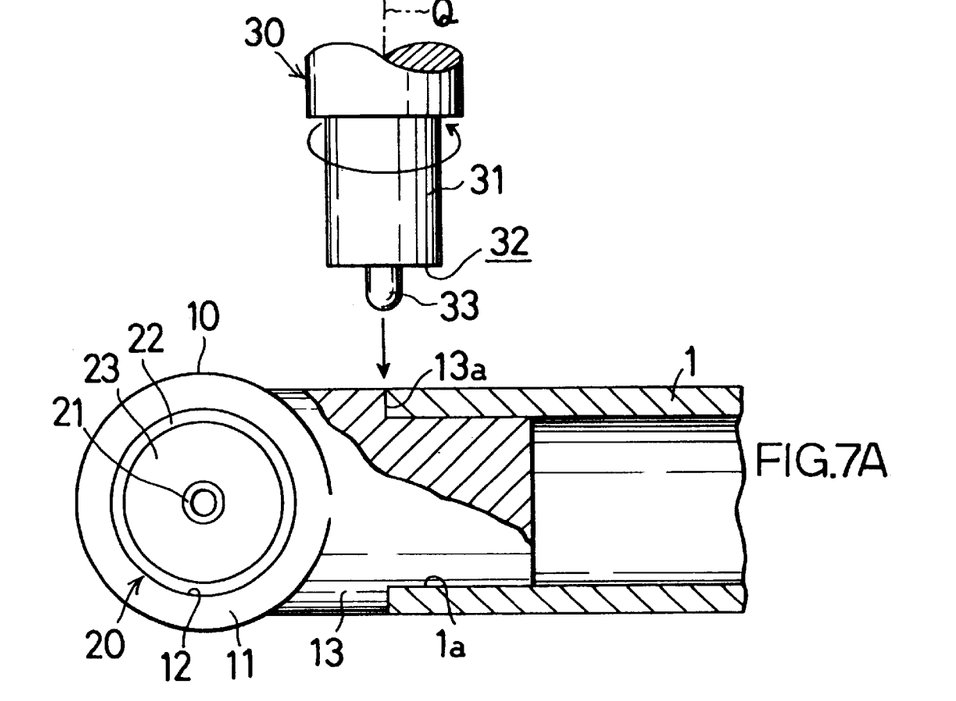
FIG. 7A is a cross-sectional view showing a connected structure according to another embodiment of the present invention.
Figure 7B:
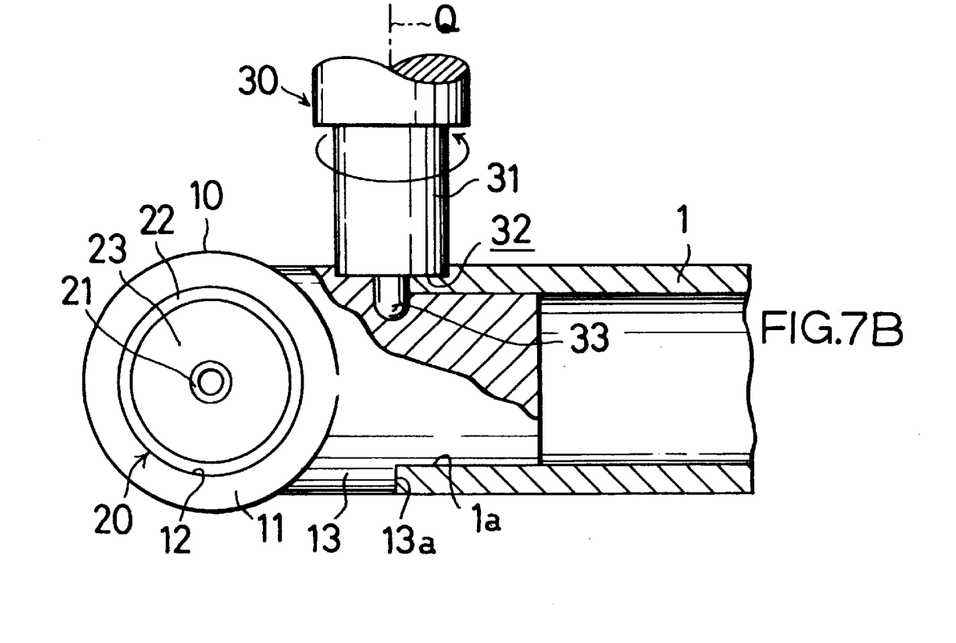
FIG. 7B is a cross-sectional view showing a probe of a joining device being inserted into a supporting member and a connecting portion of FIG. 7A, which corresponds to FIG. 3A.

In the above-mentioned connected structure for use as a suspension arm, the connecting portion 13 of the bushing mounting member 10 is inserted into the end opening 1a of the supporting member 1, and the overlapped portion of the connecting portion 13 and the supporting member 1 are joined by inserting the rotating probe 33 of the joining device 30 into the overlapped portion from the outer surface of the supporting member 1, in other words, the overlapped portion is lap welded. Alternatively, the supporting member 1 and the connecting portion 13 can be joined at the but portion thereof as shown in FIGS. 7A and 7B in which the same reference numerals are used as in the first embodiment. The embodiment illustrated in FIGS. 7A and 7B is now described as follows.

The connecting portion 13 of the bushing mounting member 10 has a reduced diameter portion with a stepped portion 13a. The reduced amount of the radius of the reduced diameter portion corresponds to the thickness of the supporting member 1, and the stepped portion 13a is located at longitudinally middle portion of the connecting portion 13. As shown in FIG. 7A, the reduced diameter portion of the connecting portion 13 is inserted into the opening 1a of the supporting member 1 until the stepped portion 13a butts against the edge of the supporting member 1. Then, the rotating probe 33 is inserted into the butted portion of the stepped portion 13a and the supporting member 1 until the end surface 32 of the rotor 31 is inserted into a larger diameter portion of the connecting portion 13 and the supporting member 1 as shown in FIG. 7B in the same manner as in the above embodiments. Thereafter, the posture of the rotating rotor 31 is changed such that the end surface 32 of the rotor 31 is buried in the downstream portion of the supporting member 1 and the connecting portion 13 and is lifted up from the upstream portion thereof. In this state, the supporting member 1 and the bushing mounting member 10 are rotated together so that the butted portion of the supporting member 1 and the stepped portion 13a of the connecting portion 13 passes against the probe 33. Thus, the supporting member 1 and the bushing mounting member 10 is integrally joined to obtain a connected structure for use as a suspension arm.

In the above described embodiments, the joining of the supporting member 1 and the bushing mounting member 10 is performed such that the portion A of the end surface 32 of the rotor 31 located at the downstream side of the rotating supporting member 1 and an inside portion B1 of the end surface 32 located at an upstream side of the rotating 1S supporting member 1 is buried in the supporting member 1 while an outside portion B2 of the end surface 32 located at the upstream side is lifted up from the surface of the supporting member 1. Accordingly, the following problems can be solved.

In a case where a diameter of the supporting member 1 is small, when the probe 33 is inserted into the coupled portion of the supporting member 1 and the connecting portion 13 so that the end surface 32 of the rotor 31 contacts the surface of the coupled portion, the contact area between the end surface 32 of the rotor 31 and the outer surface of the coupled portion is small. Therefore, the amount of friction heat generated by the friction between the end surface 32 and the outer surface of the coupled portion is small. As a result, it takes a time to soften the portion of the supporting member 1 and the connecting portion 13 where the probe 31 contacts and a region there-around. If the entire end surface 32 of the rotor 31 is inserted into the supporting member 1 or further into the connecting portion 13 in order to enlarge the contact area, the edge of the end surface of the rotor 31 will be caught by the matrix of the upstream portion of the rotating supporting member 1, resulting in a suspension arm having a poor joint quality.

As described above, in the embodiments of the present invention, the supporting member 1 and the bushing mounting member 10 are rotated in a state that the portion A of the end surface 32 of the rotor 31 located at the downstream side of the rotating supporting member 1 and an inside portion B1 of the end surface 32 located at an upstream side of the rotating supporting member 1 are buried in the supporting member 1 while an outside portion B2 of the end surface 32 located at the upstream side of the rotating supporting member 1 is lifted up from the surface of the supporting member 1.

Therefore, the contact area of the end surface 32 of the rotor 31 and the supporting member 1 can be enlarged, and the amount of friction heat generated by the friction between the portions A, B1 of the end surface 32 of the rotor 31 and the surface of the coupled portion and the inner matrix thereof can be increased. Due to the friction heat generated as described above and the friction heat generated by the rotating probe 33, the portion of the supporting member 1 and the connecting portion 13 where the probe 33 contacts and the region there-around can be soften quickly. Therefore, even if the supporting member 1 has a small outer diameter of 100 mm or less, it is possible to generate larger amount of friction heat, resulting in a quick joining of the supporting member 1 and the connecting portion 13 of the bushing mounting member 10. Further, due to the increased amount of friction heat, the joining can be quickly performed and the joining efficiency can be improved. In addition, since the portion B2 of the end surface 32 of the rotor 31 located at the upstream side of the rotating supporting member 1 is lifted up from the surface of the upstream side of the coupled portion, the matrix of the supporting member 1 can be prevented from being tearing off. Thus, a suspension arm having fine joint quality can be obtained.

In the above described embodiment, the supporting member 1 and the bushing mounting member 10 are rotated so that the coupled portion of the supporting member 1 and the bushing mounting member 10 passes against the probe 33. Alternatively, the probe 33 may be circumferentially moved along the predetermined joining area 2 of the coupled portion.

In this case, the probe 33 is moved such that the end surface 32 of the rotor 31 presses a portion of the coupled portion located behind the rotor 31 and is lifted up from a portion of the coupled portion located ahead of the rotor 31.

Though the present invention has been described with referring to the illustrated embodiments, the present invention is not limited thereto.

For example, in the above-described embodiments, the bushing mounting member 10 is an aluminum die-cast article. However, the bushing mounting member 10 may be made by cutting an aluminum extruded article, which includes the bushing mounting portion 11 and the connecting portion integrally formed with the bushing mounting portion 11, into a desired length in the direction of the extrusion and then shaping the connecting portion into a column-shape. Alternatively, the bushing mounting member 10 may be made by forging or casting.

In the above-described embodiment, the cylindrical vibroisolating bushing 20 includes a central supporting member 21, a rigid sleeve 22 and a rubber elastic member 23 disposed therebetween. Alternatively, the rigid sleeve 22 may be omitted and liquid may be introduced into an inside of the rubber elastic member 23 from an inlet provided on an outer circumference thereof and sealed, so that the sealed liquid performs vibroisolating function.

In the above-referenced embodiment, the bushing 20 is press-fitted into the bushing mounting portion 11. Alternatively, a clamping-type bushing mounting portion may be used. The clamping-type bushing mounting portion 12 includes a slit (not shown) extending in an axial direction thereof at one circumferential portion of the bushing mounting portion 12 so that the bushing mounting portion 12 can be opened in a spanning manner. Further, a pair of connecting portions (not shown) is provided on or around opposing edges of the bushing mounting portion 11. The bushing 20 is fixed within the opening 12 with its outer circumference tightly contacted with an inner circumference of the opening 12 by fastening the connecting portions.

In the above-described embodiments, two bushing mounting members 10, 10 are connected to the opposite ends of the supporting member 1. Instead, only one bushing member 10 may be connected to the supporting member 1.

The connected structure according to the present invention is not limited to a suspension arm, but may be applied to as an engine mount or the similar structure, as far as the bushing mounting member having a bushing mounting portion for mounting a bushing is connected to a supporting member.

EXAMPLE

In order to manufacture the connected structure for use as a suspension arm as shown in FIGS. 1 to 55, the supporting members 1 and the bushing mounting members 10 are made from JIS (Japanese Industrial Standard) A6061 aluminum alloy, respectively. The connecting portion 13 of the bushing mounting member 10 is inserted into the opening 1a of the supporting member 1, and the coupled portion of the connecting portion 13 and the supporting member 1 is joined along a circumference of the supporting member 1 by a friction agitation joining method to obtain the connected structure according to the present invention, which is referred to as an Example. On the other hand, in Reference, the joining was performed by a TIG welding method. The highest temperature in the opening 12 of the bushing mounting member 10 during the joining process and the joint efficiency were measured. These results were shown in the TABLE 1 as follows.

TABLE 1

| — | Joining Method | Highest Temperature (° C.) | Joint efficiency (%) |
|---|---|---|---|
| Example | Friction Agitation Joining | 150 | 80 |
| Reference | TIG Welding | 250 | 66 |

As shown in TABLE 1, the highest temperature of the Example was lower than that of the Reference, and the joint efficiency of the Example was higher than that of the Reference. Accordingly, in the Example, the bushing 20 press-fitted into the opening 12 was not much adversely affected by heat and the characteristics of the bushing 20 was maintained. Further, high joint strength was obtained. According to the visual inspection of the joint of the obtained connected structure, thermal fatigue was observed in the Reference. However, in the Example, no thermal fatigue was observed.

As described above, according to the present invention, the connected member is light in weight since the supporting member is a hollow article. Further, since the connecting portion of the bushing mounting member is inserted into the opening at one end of the supporting member and joined together along a circumference of the supporting member by friction agitation joining method, a connecting member with high join strength and fine joint quality can be obtained.

Even if the friction agitation joining method is performed in a state that the busing is mounted in the bushing mounting portion, characteristics of the bushing can be well maintained since the rubber elastic member of the bushing is hardly affected by heat.

When the hollow supporting member has a circular cross-section, surrounding space of the supporting member can be efficiently utilized.

According to the method for manufacturing the connected structure according to the present invention, the lightweight connected structure can be obtained since a hollow article is used as the supporting member. Further, since the connecting portion of the bushing mounting member is inserted into the opening at one end of the supporting member and joined together along a circumference of the supporting member by a friction agitation joining method, a connecting member with high join strength and fine joint quality can be obtained.

Even if the friction agitation joining method is performed in a state that the busing is mounted in the bushing mounting portion, characteristics of the bushing can be well maintained since the rubber elastic member of the bushing is hardly affected by heat.

When the hollow supporting member has a circular cross-section, a connected structure having high space utility around thereof can be obtained.

If the connecting portion of the bushing mounting portion is press-fitted into the opening of the supporting member and the friction agitation joining method is performed by inserting a rotating probe into the connecting portion from the supporting member to soften and agitate a portion where the probe contacts by friction heat, and rotating one of the connecting portion and the supporting member along axis thereof so that both of the joining portion and the supporting member rotate together and the rotating probe advances along a circumference of the supporting member, the joining work can be simplified.

If the friction agitation joining method is performed by using a joining device having a pin-shaped probe coaxially integrally protruded from a shoulder of a columnar rotor having a diameter larger than a diameter of the prove, inserting the rotating probe into the connecting portion from supporting member to soften and agitate a portion where the probe contacts by friction heat, and advancing the rotating probe along a circumference of the supporting member in such a state that the end surface of the columnar rotor presses a portion of the supporting member located behind the columnar rotor and is lifted up from a portion of the supporting member located ahead of the columnar rotor, friction heat is generated by the friction between the pressed portion of the end surface of the columnar rotor and the surface and the inner matrix of the supporting member, resulting in a speedy softening and joining. Thus, even if the supporting member has a small diameter, the joining work can be performed speedy. Further, if the end surface of the columnar rotor is lifted up from a portion of the supporting member located ahead of the columnar rotor, the edge of the end surface of the columnar rotor facing the portion of the supporting member is prevented from being caught by the surface of the supporting member not to tear off the surface while the rotating probe advances. As a result, a connecting member with fine joint quality can be obtained.

If the friction agitation joining method is performed by using a joining device having a pin-shaped probe coaxially integrally protruded from an end surface of a columnar rotor having a diameter larger than a diameter of the prove, inserting the rotating probe into the connecting portion from the supporting member to soften and agitate a portion where the probe contacts by friction heat, and rotating the connecting portion and the supporting member against the rotating prove in such a state that the end surface of the columnar rotor presses a downstream portion of the supporting member and is lifted up from an upstream portion of the supporting member, the efficiency of joining process can be improved by the same reason as described above. Thus, even if the supporting member has a small diameter, the joining process can be performed speedy. Further, if the end surface of the columnar rotor is lifted up from the surface of the upstream portion of the supporting member, the edge of the end surface of the rotor facing the upstream portion of the supporting member is prevented from being caught by the surface of the supporting member not to tear off the surface while the connecting portion and the supporting member rotate. As a result, a connecting member with fine joint quality can be obtained.

This application claims priority to Japanese Patent Application No. H9(1997)-356579 filed on Dec. 25, 1997, the disclosure of which is incorporated by reference in its entirety.

It should be noted that the terms and expressions used herein are illustrative only, are not intended to limit the scope of the invention and does not exclude any equivalent of features indicated and described herein and that various modifications and variations falling within the scope of claims of the invention are tolerated.

What is claimed is:

1. A method for manufacturing a connected structure, said connected structure including a supporting member and a bushing mounting member connected to said supporting member, including the steps of:
    preparing a hollow supporting member having an opening at one end thereof and a circular cross-sectional shape, said hollow supporting member having an outer diameter of 100 mm or less;
    preparing a bushing mounting member having a bushing mounting portion for mounting a bushing having a rubber elastic member and a connecting portion that is not hollow protruded from said bushing mounting portion;
    inserting said connecting portion into said opening of said hollow supporting member; and
    joining said connecting portion and said hollow supporting member along a circumference of said hollow supporting member by a friction agitation joining method.

2. The method as recited in claim 1, wherein said friction agitation joining method is performed in a state that said bushing is mounted in said bushing mounting portion.

3. The method as recited in claim 1, wherein said connecting portion is press-fitted into said opening of said hollow supporting member, and wherein said friction agitation joining method is performed by:
    inserting a rotating probe into said connecting portion from said hollow supporting member to soften and agitate a portion where said probe contacts by friction heat; and
    rotating one of said connecting portion and said hollow supporting member along axis thereof, whereby both of said connecting portion and said hollow supporting member rotate together and said rotating probe advances along a circumference of said hollow supporting member.

4. The method as recited in claim 1, wherein said friction agitation joining method is performed by:
    using a joining device having a pin-shaped probe coaxially integrally protruded from an end surface of a columnar rotor having a diameter larger than a diameter of said probe;
    inserting said rotating probe into said connecting portion from said hollow supporting member to soften and agitate a portion where said probe contacts by friction heat;
    advancing said rotating probe along a circumference of said hollow supporting member in such a state that said end surface of said columnar rotor presses a portion of said hollow supporting member located behind said columnar rotor and is lifted up from a portion of said hollow supporting member located ahead of said columnar rotor.

5. The method as recited in claim 1, wherein said friction agitation joining method is performed by:
    using a joining device having a pin-shaped probe coaxially integrally protruded from an end surface of a columnar rotor having a diameter larger than a diameter of said probe;
    inserting said rotating probe into said connecting portion from said hollow supporting member to soften and agitate a portion where said probe contacts by friction heat;
    rotating said connecting portion and said hollow supporting member against said rotating probe in such a state that said end surface of said columnar rotor presses a downstream portion of said supporting member and is lifted up from an upstream portion of said supporting member.

6. The method as recited in claim 1, wherein said friction agitation joining method is performed by:
    using a joining device having a pin-shaped probe coaxially integrally protruded from an end surface of a columnar rotor having a diameter larger than a diameter of said probe;

inserting said rotating probe into said connecting portion from said hollow supporting member in a state in which said columnar rotor is vertically disposed with said pin-shaped probe faced downwardly while said hollow supporting member is located below said pin-shaped probe; and rotating said connecting portion and said hollow supporting member about an axis of said hollow supporting member against said rotating probe in a state in which said end surface of said columnar rotor presses a downstream portion of said hollow supporting member and is lifted up from an upstream portion of said hollow supporting member by offsetting an axis of said rotor from said axis of said supporting member to soften and agitate a portion where said probe contacts by friction heat.

* * * * *